(12) United States Patent
Hwang

(10) Patent No.: US 10,468,908 B2
(45) Date of Patent: Nov. 5, 2019

(54) ELECTRONIC EQUIPMENT AND CONTROL METHOD FOR THE SAME

(71) Applicant: LG ELECTRONICS INC., Seoul (KR)

(72) Inventor: Jeongwon Hwang, Seoul (KR)

(73) Assignee: LG Electronics inc., Seoul (KR)

( * ) Notice: Subject to any disclaimer, the term of this patent is extended or adjusted under 35 U.S.C. 154(b) by 216 days.

(21) Appl. No.: 15/712,737

(22) Filed: Sep. 22, 2017

(65) Prior Publication Data

US 2018/0090982 A1 Mar. 29, 2018

(30) Foreign Application Priority Data

Sep. 28, 2016 (KR) .................. 10-2016-0124850

(51) Int. Cl.
*H02J 9/00* (2006.01)
*D06F 33/02* (2006.01)
(Continued)

(52) U.S. Cl.
CPC .............. *H02J 9/005* (2013.01); *D06F 33/02* (2013.01); *G06F 1/3203* (2013.01);
(Continued)

(58) Field of Classification Search
CPC ......... D06F 33/02; G06F 1/3203; H02J 9/005
See application file for complete search history.

(56) References Cited

U.S. PATENT DOCUMENTS 4,531,237 A 7/1985 Bar
6,085,017 A * 7/2000 Rilly .................... H04B 1/1615
386/277
(Continued)

FOREIGN PATENT DOCUMENTS

DE 102008040744 A1 1/2010
DE 102008042832 A1 4/2010
(Continued)

OTHER PUBLICATIONS

Extended European Search Report in European Application No. 17193352.6, dated Jan. 7, 2018, 13 pages.
XP-002777597, Clarivate Analytics, 2017, 2 pages.

*Primary Examiner* — Jared Fureman
*Assistant Examiner* — Emmanuel Dominique
(74) *Attorney, Agent, or Firm* — Fish & Richardson P.C.

(57) ABSTRACT

A method of controlling an electronic apparatus includes supplying power to a second controller, receiving an activation time for supplying power to a communication portion and a deactivation time for interrupting power to the communication portion, setting time information based on the activation time and the deactivation time, performing, based on the time information, a standby step that includes interrupting power to a first controller, a first load portion, and the communication portion while supplying power to the second controller, controlling the communication portion switch to supply power to the communication portion based on the activation time, determining whether the communication portion has received the control command from the remote control terminal, and interrupting the power supplied to the communication portion and re-executing the standby step based on determining that the communication portion has not received the control command from the remote control terminal.

20 Claims, 3 Drawing Sheets

(51) Int. Cl.
*G06F 1/3203* (2019.01)
*A47L 15/00* (2006.01)
*D06F 39/00* (2006.01)
*H04B 1/16* (2006.01)
*H02J 13/00* (2006.01)

(52) U.S. Cl.
CPC ......... *A47L 15/0063* (2013.01); *D06F 39/005* (2013.01); *D06F 2210/00* (2013.01); *D06F 2220/00* (2013.01); *H02J 13/0006* (2013.01); *H04B 1/1615* (2013.01)

(56) References Cited

U.S. PATENT DOCUMENTS

| | | | | |
|---|---|---|---|---|
| 6,107,698 | A | * | 8/2000 | Ochiai ............... H02J 9/005 307/43 |
| 2003/0176928 | A1 | | 9/2003 | Lee |
| 2011/0080210 | A1 | | 4/2011 | Kondo |
| 2011/0313587 | A1 | * | 12/2011 | Lin ............... H02H 3/0935 700/296 |
| 2012/0201062 | A1 | * | 8/2012 | Lee ............... H02J 9/005 363/84 |
| 2014/0042819 | A1 | * | 2/2014 | Yu ............... H02J 9/005 307/80 |

FOREIGN PATENT DOCUMENTS

| | | |
|---|---|---|
| GB | 2464661 A1 | 4/2010 |
| JP | 7087570 A1 | 3/1995 |
| JP | 2015159989 A1 | 9/2015 |

* cited by examiner

ELECTRONIC EQUIPMENT AND CONTROL METHOD FOR THE SAME

CROSS REFERENCE TO RELATED APPLICATIONS

This application claims the benefit of Korean Patent Application No. 10-2016-0124850, filed on Sep. 28, 2016, which is hereby incorporated by reference as if fully set forth herein.

FIELD

The present disclosure relates to electronic equipment such as a laundry treating apparatus, a dishwasher, or an oven, and a control method for the same.

BACKGROUND

A laundry treating apparatus may be an apparatus for washing clothes, an apparatus for drying clothes, or an apparatus for performing both washing and drying of clothes. A dishwasher may be an apparatus for removing foreign matter from dishes by spraying water onto objects to be washed such as a tableware. An oven may be an apparatus for heating cooking materials such as food and bakeware.

A laundry treating apparatus for washing clothes may include a tub for storing water, a drum rotatably provided in the tub to store clothes, a motor for rotating the drum, a water supply valve for controlling a channel through which water is supplied to the tub, and a drain pump for draining water stored in the tub. A laundry treating apparatus for drying laundry may include a drum for storing clothes, a motor for rotating the drum, and an air supply portion for supplying heated air to the drum.

A dishwasher may include a tub for accommodating an object to be washed, a spray arm for spraying water to an object to be washed, a pump for supplying water to the spray arm, a heater for heating the water supplied to the pump, and a drain pump for draining water stored in the tub. An oven may include a heater for heating a space for accommodating an object to heat such as a cooking material and a fan for circulating or discharging air from the space in which the object to heat is accommodated.

In some cases, the electronic apparatuses described above can be remotely controllable. For example, when a user located outside the electronic apparatuses transmits a control command to an individual electronic apparatus through a remote control terminal (e.g., remote controller, cell phone, tablet, computer, or the like), the electronic device operates according to the received control command.

In some examples, remote control of an electronic apparatus may require electric power to remain supplied to all the components necessary for operation of each electronic apparatus. In this case, when the user sends a control command to the electronic apparatus via the remote control terminal, the electronic apparatus may be operated immediately.

In some cases, the electronic apparatus may consume a large amount of standby power because power is kept supplied to the electronic apparatus so that it can be controlled from the outside by the user. For example, all the components necessary for operation of each electronic apparatus may have to be kept being powered on to receive the user input through a remote control terminal and perform operations accordingly.

SUMMARY

The present disclosure describes electronic equipment and a control method for the same that may solve one or more problems, limitations, and disadvantages of the related art.

An object of the present disclosure is to provide electronic equipment capable of minimizing consumption of standby power of a remotely controllable electronic apparatus and a control method for the same.

Another object of the present disclosure is to provide an electronic apparatus that is remotely controllable even when the user goes out without setting a remote control mode and a control method for the same.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

An electronic apparatus may include a first load portion configured to receive power from a power source to generate electrical or mechanical energy, a first controller configured to control the first load portion, a communication portion configured to communicate with a remote control terminal that is configured to transmit a control command, a power input portion configured to open and close both a first controller power line that connects the power source to the first controller and a load portion power line that connects the power source to the first load portion, a communication portion power line that connects the power source to the communication portion, a communication portion switch configured to open and close the communication portion power line, a load portion switch configured to open and close the load portion power line and to be controlled by the first controller, a second controller configured to control the communication portion and the communication portion switch and to communicate with the first controller, and a second controller power line that connects the power source to the second controller.

According to one aspect of the subject matter described in this application, A method for controlling the electronic apparatus includes supplying power to the second controller, receiving an activation time for supplying power to the communication portion and a deactivation time for interrupting power to the communication portion, setting time information based on the activation time and the deactivation time, based on the time information, performing a standby step that includes interrupting power to the first controller, the first load portion, and the communication portion while supplying power to the second controller, based on the activation time, controlling the communication portion switch to supply power to the communication portion, determining whether the communication portion has received the control command from the remote control terminal, and based on determining that the communication portion has not received the control command from the remote control terminal, interrupting the power supplied to the communication portion and re-executing the standby step.

Implementations according to this aspect may include one or more of following features. For example, the method may further include controlling the power input portion to supply power to the first controller based on determining that the communication portion has received the control command from the remote control terminal, controlling the load portion switch to supply power to the first load portion, and controlling, by the first controller, the first load portion to perform an operation corresponding to the received control command. In some examples, the method may further include, based on completion of the operation by the first load portion, controlling the power input portion and the communication portion switch to interrupt power to the first controller, the first load portion, and the communication portion, and re-executing the standby step.

In some implementations, re-executing the standby step based on completion of the operation by the first load portion includes controlling, by the first controller, the load portion switch to interrupt power supplied to the first load portion, controlling, by the second controller, the power input portion to interrupt power to the first controller, and controlling, by the second controller, the communication portion switch to interrupt power to the communication portion.

In some implementations, the method may further include, based on the second controller controlling the communication portion switch to supply power to the communication portion, transmitting a message to the remote control terminal to indicate that the communication portion is activated. In some examples, receiving the activation time and the deactivation time may include receiving the activation time and the deactivation time through a user input portion of the electronic apparatus configured to receive a user input. In other examples, receiving the activation time and the deactivation time may include receiving the activation time and the deactivation time through the remote control terminal.

In some implementations, setting the time information may include setting a reference period of time for which power is supplied to the communication portion. The method may further include, based on receiving the control command from the remote control terminal requesting change of the activation time and the deactivation time, changing the activation time and the deactivation time while the second controller controlling the communication portion switch to supply power to the communication portion. In some examples, controlling the communication portion switch to supply power to the communication portion may include supplying power to the communication portion for a predetermined period of time from the activation time.

In some implementations, controlling the communication portion switch to supply power to the communication portion may include supplying power to the communication portion from the activation time until the deactivation time. Determining whether the communication portion has received the control command from the remote control terminal may include determining whether the communication portion has received the control command from the remote control terminal between the activation time and the deactivation time. In some examples, determining whether the communication portion has received the control command from the remote control terminal may include determining whether the communication portion has received the control command from the remote control terminal within a predetermined time from the activation time.

In some examples, supplying power to the second controller may include supplying power to the second controller regardless of the power input portion opening or closing the first controller power line. The method may further include controlling the power input portion to supply power to the first controller based on determining that the communication portion has received the control command from the remote control terminal.

According to another aspect, an electronic apparatus, which is for remote control through a remote control terminal configured to remotely transmit a control command, includes a first load portion configured to receive power from a power source to generate electrical or mechanical energy, a first controller configured to control the first load portion, an input portion configured to receive a user input, a first controller power line connecting the power source to the first controller, a load portion power line connecting the power source to the first load portion, a power input portion configured to open and close both of the first controller power line and the load portion power line, a communication portion configured to communicate with the remote control terminal, a communication portion power line connecting the power source to the communication portion, a communication portion switch configured to open and close the communication portion power line, a load portion switch configured to open and close the load portion power line, the load portion switch being controlled by the first controller, and a second controller configured to receive power from the power source through a second controller power line, to communicate with the first controller, and to control the communication portion, the communication portion switch, and the input portion. The second controller is further configured to receive an activation time and a deactivation time of the electronic apparatus through the remote control terminal or the input portion, and to supply power to the communication portion for a predetermined period time between the activation time and the deactivation time based on the power input portion interrupting power to the first controller and the first load portion.

Implementations according to this aspect may include one or more of following features. For example, the first load portion may include at least one of a motor configured to rotate a drum accommodating clothes, a valve configured to open and close a water supply pipe connecting a water supply source to the drum, or a drainage pump configured to drain water from the drum.

In some examples, the first load portion may include at least one of a motor configured to rotate a drum accommodating clothes or an air supply portion configured to supply heated air to the drum. In some examples, the first load portion may include at least one of a pump configured to spray water onto an object to be washed or a heater configured to heat water supplied to the pump. In some examples, the first load portion may at least one of a heater configured to provide heat to a space for accommodating an object or a fan configured to circulate or discharge air in or from the space accommodating the object.

It is to be understood that both the foregoing description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate implementations of the disclosure and together with the description serve to explain the principle of the disclosure.

DETAILED DESCRIPTION

Reference will now be made in detail to example implementations of the present disclosure, which are illustrated in the accompanying drawings. It is to be understood that both the foregoing description and the following detailed description are exemplary and explanatory only and are not restrictive of the scope of the disclosure. Wherever possible, the same reference numbers will be used throughout the drawings to refer to the same or like parts.

Figure 1:
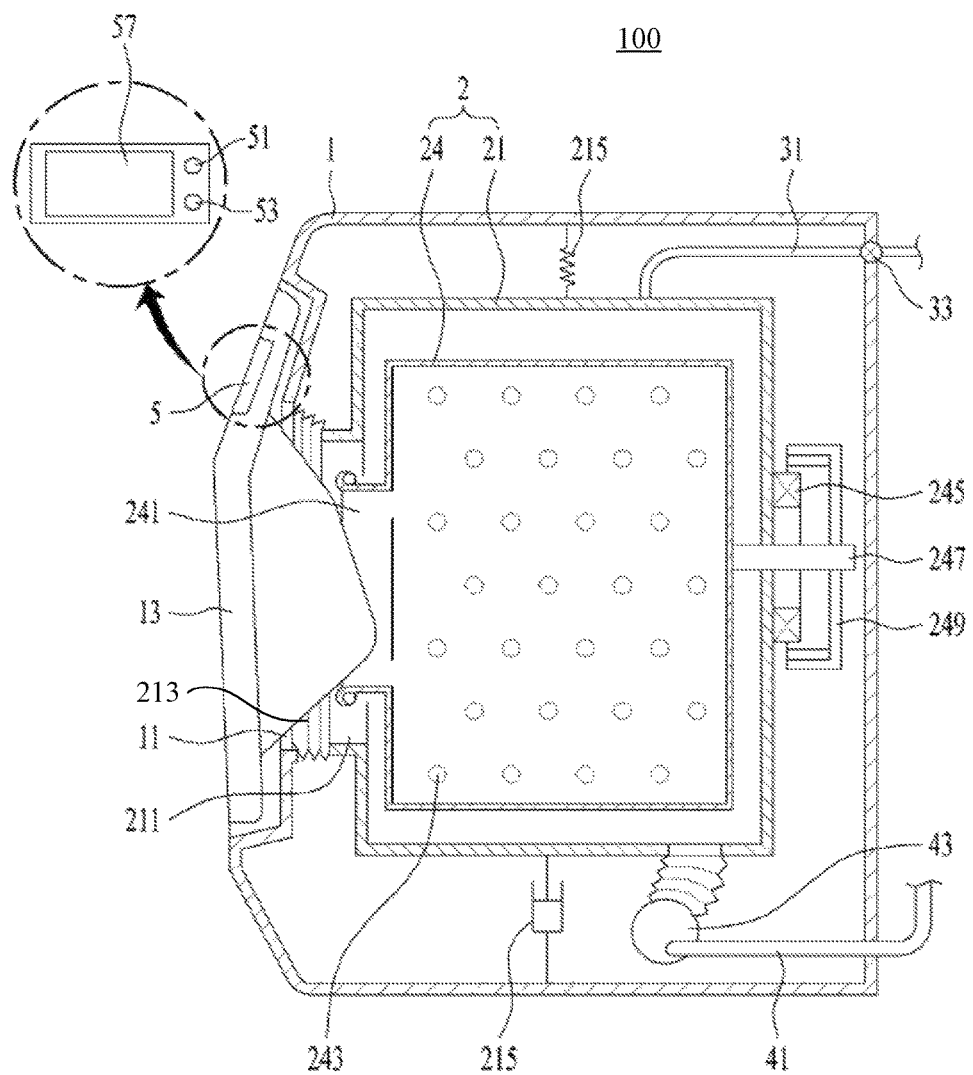
FIG. 1 shows an example laundry treating apparatus as an example of electronic apparatus.

The present disclosure relates to an electronic apparatus that can perform a function by receiving power and a control method for the same. FIG. 1 illustrates an example laundry treating apparatus 100 for washing or drying clothes to show an example of electronic apparatus.

For example, the laundry treating apparatus 100 includes a cabinet 1 and an accommodation portion 2 provided in the cabinet to provide a space for accommodating clothes.

The front face of the cabinet 1 is provided with an introduction port 11 for introducing clothing into the accommodation portion 2 or retrieving clothing stored in the drum. The introduction port is opened/closed by a door 13, which is rotatably fixed to the cabinet 1. The door 13 may be provided with a control panel 5 for receiving a control command from the user and displaying progress of the input control command.

When the laundry treating apparatus 100 of the present disclosure is configured as an apparatus for washing clothes, the accommodation portion 2 may include a tub 21 provided inside the cabinet 1 to provide a space for storing water, and a drum 24 rotatably provided in the drum 24 to provide a space for storing clothes.

The tub 21 may be provided with a tub introduction port 211 communicating with the introduction port 11. The introduction port 11 and the tub introduction port 211 may be connected to each other through a gasket 213.

The tub 21 is fixed to the inside of the cabinet 1 through a support portion 215. The support portion may include a spring for connecting the upper circumferential surface of the tub 21 to the cabinet 1, and a damper for connecting the lower circumferential surface of the tub to the bottom surface of the cabinet.

The tub 21 may be supplied with water through a water supply portion 31, 33, and the water stored in the tub may be discharged from the cabinet through the drainage portion 41, 43.

The water supply portion may include a water supply pipe 31 for connecting the tub and the water supply source and a valve 33 for opening and closing the water supply pipe, and the drainage portion may include a drainage pump 43 and a drain pipe 41 for guiding water discharged from the drainage pump to the outside of the cabinet.

The drum 24 includes a drum introduction port 241 communicating with the introduction port 11 and the tub introduction port 211, and a plurality of through holes 243 allowing the interior of the drum to communicate with the interior of the tub therethrough.

The drum 24 may be rotated by a motor. The motor may include a stator 245 fixed to the back surface of the tub to form a rotating field when electric current is supplied thereto, a rotor 249 rotated by the rotating field, and a rotation shaft 247 for connecting the drum with the rotor through the tub.

When the laundry treating apparatus 100 of the present disclosure is configured as an apparatus for drying clothes, the accommodation portion 2 may be provided with only the drum 24 arranged inside the cabinet 1 to provide a space for storing clothes. In this case, an air supply portion for supplying heated air to the drum should be further provided in the cabinet. The air supply portion may include a supply duct for guiding external air into to the drum, a discharge duct for discharging the air from the drum, and a fan and a heater provided in the supply duct.

As described above, the door 13 may be provided with a control panel 5 for displaying a control command selectable by the user, receiving a control command from a user, and displaying the control command that is being executed by the laundry treating apparatus.

The control panel 5 may include an input portion 53 for inputting a control command, and a display portion 57 for displaying progress of a control command selectable by the user and displaying the progress of the control command.

The loads or objects provided in the laundry treating apparatus 100, which may receive power from a power source to generate electric energy or mechanical energy, are supplied with the power through a power input portion 51. The power input portion 51 may include a switch for controlling opening and closing of a power supply circuit for connecting the power source and the loads. FIG. 1 illustrates an example in which the power input portion 51 is provided at the control panel 5.

Figure 2:
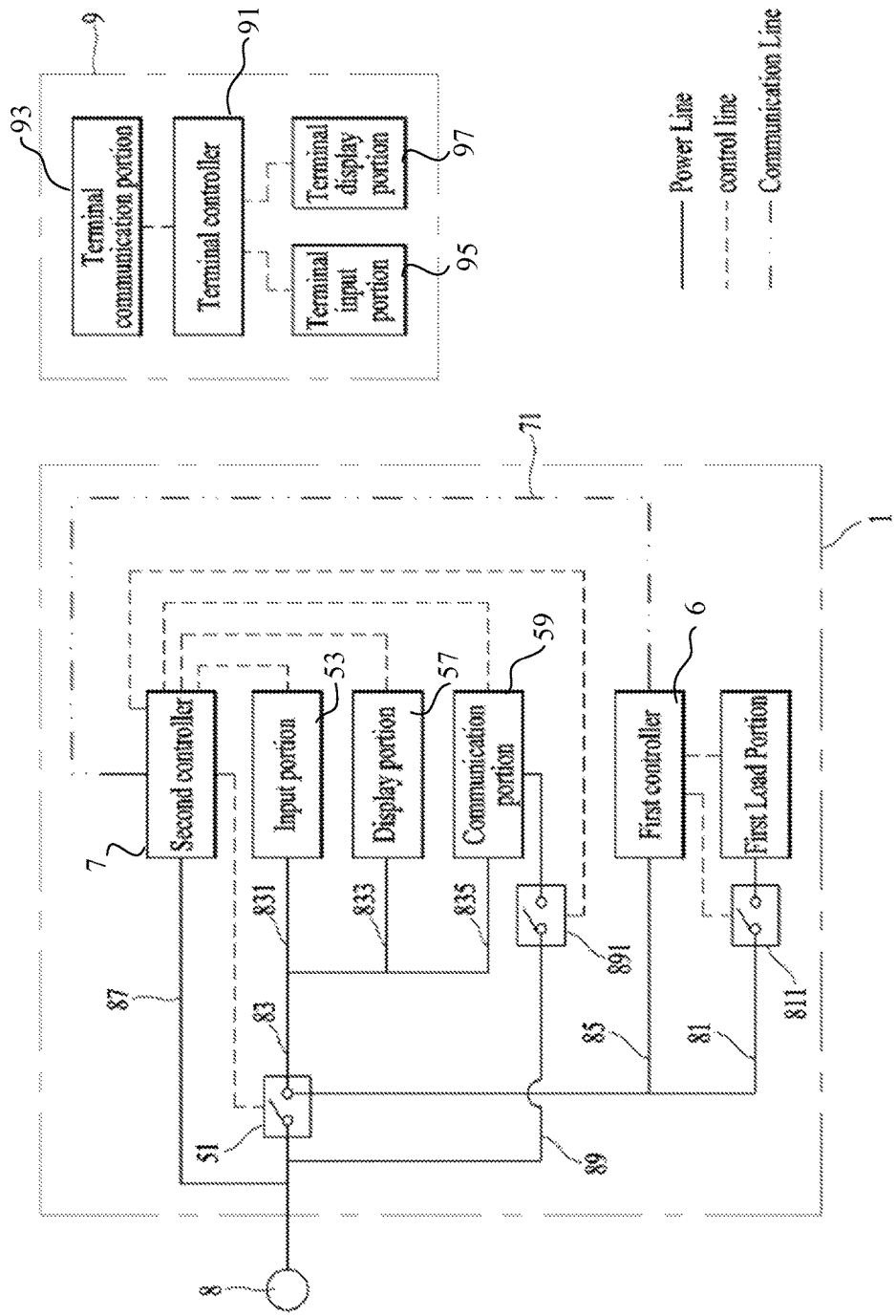
FIG. 2 shows example components of an electronic apparatus.

As shown in FIG. 2, the loads provided in the laundry treating apparatus 100 are configured to operate under control of a first controller 6 and a second controller 7.

For example, the loads provided in the present disclosure include a stator 245 of the motor provided to rotate the drum 24, the valve 33 of the water supply portion, the drainage pump 43 of the drainage portion, the input portion 53 and the display portion 57 included in the control panel, and a communication portion 59. In some examples, the loads may be divided into a first load portion controlled by the first controller 6 and a second load portion controlled by the second controller 7.

FIG. 2 illustrates a case where the first load portion includes the stator 245, the valve 33 and the drainage pump 43, and the second load portion includes the input portion 53, the display portion 57 and the communication portion 59.

The communication portion 59 is a communication device with a remote control terminal 9 capable of remotely transmitting a control command. The remote control terminal 9 may include any terminal such as a cell phone or the like that is capable of communicating with the laundry treating apparatus 100 through the communication portion 59.

The remote control terminal 9 may include a terminal communication portion 93 for communicating with the communication portion 59 included in the laundry treating apparatus, a terminal input portion 95 for inputting a control command for remote control, and a terminal display portion 97 for displaying information received through the terminal communication portion 93. In this case, the terminal communication portion 93, the terminal input portion 95 and the terminal display portion 97 may be controlled by a terminal controller 91.

Accordingly, a control command input to the remote control terminal 9 through the terminal input portion 95 may be transmitted to the laundry treating apparatus 100 through the terminal communication portion 93, and the information generated in the laundry treating apparatus 100 may be transmitted to the remote control terminal 9 through the communication portion 59.

The first controller 6 is set to control the first load portion, and the second controller 7 is set to control the second load portion. This is intended to allow the laundry treating apparatus 100 to receive a control command transmitted from the remote control terminal 9 even if the user goes out without setting a remote control mode and is also intended to minimize consumption of standby power in the laundry treating apparatus 100.

To obtain the aforementioned effect, the first controller 6 is connected to a power source 8 through a first controller power line 85, and the second controller is connected to the power source 8 through a second controller power line 87.

The first controller power line 85 is provided with a power input portion 51. When the power input portion 51 closes a power supply circuit formed by the first controller power line 85, the first controller 6 is supplied with power from the power source 8. When the power input portion 51 opens the power supply circuit formed by the first controller power line 85, the first controller 6 may not be supplied with power.

The second controller power line 87 connects the power source 8 and the second controller 7 to each other, and is configured to constantly provide power to the second controller 7 irrespective of whether or not the power input portion 51 has opened or closed the first controller power line 85.

The first controller 6 and the second controller 7 are capable of communicating with each other through a communication line 71. That is, while power is supplied to the first controller 6, the second controller 7 may transmit a control signal to the first controller 6 through the communication line 71, and receive a control signal transmitted from the first controller 6.

The first load portion is connected to the power source 8 through a load portion power line 81. A power supply circuit formed by the load portion power line 81 is opened and closed by the power input portion 51 and a load portion switch 811.

That is, the first load portion is supplied with power when both the power input portion 51 and the load portion switch 811 close the load portion power line 81. If any one of the power input portion 51 and the load portion switch 811 opens the load portion power line 81, the first load portion cannot be supplied with power. The first load portion and the load portion switch 811 are controlled by the first controller 6.

The input portion 53 and the display portion 57 included in the control panel 5 are connected to the power source 8 through a panel power line 83 (a second load portion power line), which is opened and closed by the power input portion 51. Here, the input portion 53 is connected to the power source 8 through an input portion power line 831, and the display portion 57 is connected to the power source 8 through a display portion power line 833.

The communication portion 59 may be configured to be supplied with power through a communication portion power line 89 (a first communication portion power line) and a second communication portion power line 835. A power supply circuit formed by the communication portion power line 89 is opened and closed by the communication portion switch 891, and a power supply circuit formed by the second communication portion power line 835 is opened and closed by the power input portion 51.

The communication portion switch 891 opens and closes the communication portion power line 89 according to a control signal of the second controller 7. Accordingly, the communication portion 59 may be supplied with power when the power input portion 51 closes the second communication portion power line 835 or when the second controller 7 closes the communication portion power line 89 through the communication portion switch 891.

The panel power line 83, the first controller power line 85, and the load portion power line 81 may be simultaneously opened or closed through the power input portion 51. The power input portion 51 may be operated by the user or by the second controller 7.

For example, the power input portion 51 may be configured as a switch for controlling opening and closing of the power supply circuit for connecting the power source to the loads, and therefore the user may activate (e.g., press or touch) the power input portion 51 provided to the control panel 5 to supply power to the loads. In some implementations, even if the user does not press the power input portion 51, the second controller 7 may control the power input portion 51 to supply power to the loads.

Figure 3:
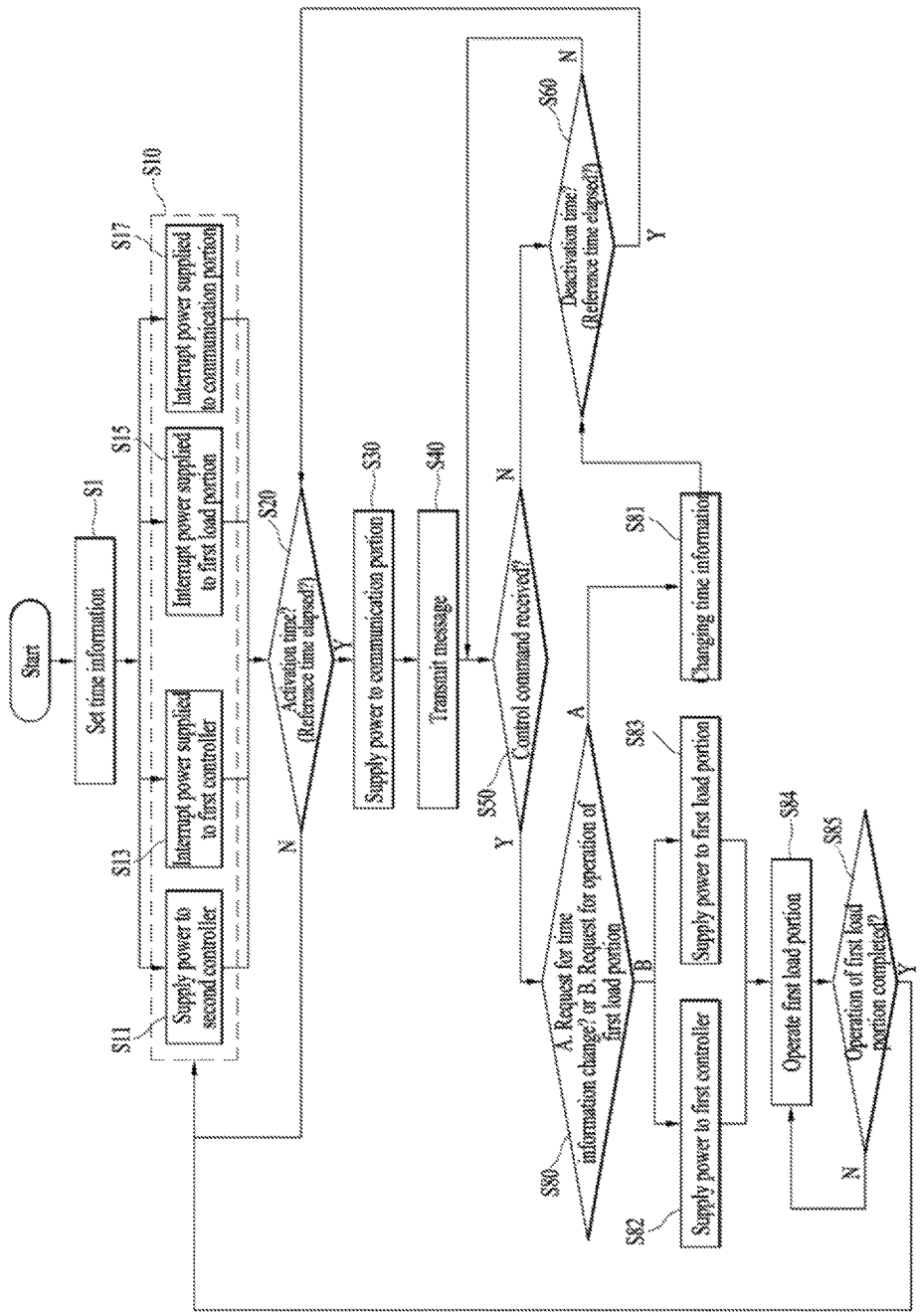
FIG. 3 illustrates an example of a control method for an electronic apparatus.

FIG. 3 illustrates an example of a control method for a laundry treating apparatus having the structure described above.

The control method of the present disclosure includes a time information setting step S1 of setting an activation time for supplying power to the communication portion 59 and a deactivation time for interrupting power supplied to the communication portion 59, a standby step S10 of supplying power to the second controller 7 and interrupting power to the other loads of the laundry treating apparatus, and a communication portion power supply step S30 of supplying power to the communication portion 59 according to the time information input through the time information setting step S30.

The time information setting step S1 may be configured to allow the user to input the activation time and the deactivation time through the input portion 53 or to input the activation time and the deactivation time through the terminal input portion 95 provided to the remote control terminal 9.

In some examples, when the time information setting step S1 is performed through the input portion 53, the user may need to input time information through the input portion 53 after supplying power to the laundry treating apparatus 100 through the power input portion 51.

The time information including the activation time and the deactivation time that has been set in the time information setting step S1 may include not only information about the time at which power is supplied to the communication portion 59 but also a period of time to supply power to the communication portion 59. For example, the time information setting step S1 may include a step of setting the activation time and the deactivation time, a step of setting a reference period for supplying power to the communication portion, and both the step of setting the activation time and the deactivation time and the step of setting the period of activation times. For instance, setting the time information may include setting a reference period of time for which power is supplied to the communication portion 59.

The standby step S10 includes a step S11 of supplying power to the second controller 7 through the second controller power line 87, a first controller power supply interruption step S13 of interrupting the power supplied to the first controller 6, a first load portion power supply interruption step S15 of interrupting power supplied to the first load portion, and a communication portion power supply interruption step S17 of interrupting power supplied to the communication portion 59.

The first controller power supply interruption step S13 and the first load portion power supply interruption step S15 may be performed by controlling the power input portion 51 to maintain an open state of a power supply circuit formed by the first controller power line 85 and the load portion power line 81.

In examples where the control method of the present disclosure is applied to the laundry treating apparatus 100, the first load portion may include at least one of the stator 245 of a motor for rotating the drum 24, the valve 33 for opening or closing the water supply pipe 31 for supplying water to the tub, the drainage pump 43 for draining water stored in the tub 21, and an air supply portion for supplying heated air to the drum 24.

The communication portion power supply interruption step S17 may be performed by controlling the power input portion 51 to open the power supply circuit formed by the second communication portion power line 835, and by controlling the communication portion switch 891 to open the power supply circuit formed by the communication portion power line 89.

The communication portion power supply step S30 is initiated when the activation time set through the time information input step S1 arrives during the standby step S10. Alternatively, the communication portion power supply step S30 may be set to be initiated when the progress time of the standby step S10 reaches the reference period set through the time information input step S1.

The communication portion power supply step S30 is a step of supplying power to the communication portion 59 through the communication portion power line 89. In the communication portion power supply step S30, the second controller 7 controls the communication portion switch 891 to close the communication portion power line 89.

When power is supplied to the communication portion 59, the step S50 is determining whether a control command transmitted from the remote control terminal 9 is received by the communication portion 59 for a predetermined reference time (S60).

When the time information setting step S1 is provided as a step of setting an activation time and a deactivation time, the reference time may be defined as a difference between the activation time and the deactivation time. When the time information setting step S1 is provided as a step of setting a reference period, the reference time may be defined as a time for which the power supplied to the communication portion is maintained.

If a control command transmitted from the remote control terminal 9 is not received by the communication portion 59 (S60) before the deactivation time arrives (e.g., within the reference time) after power is supplied to the communication portion (S30), the process re-executes the standby step S10 by interrupting power supplied to the communication portion 59.

However, if a control command transmitted from the remote control terminal 9 is received by the communication portion 59 before the deactivation time arrives (e.g., within the reference time) after power is supplied to the communication portion (S30), the control method of the present disclosure changes the time information (S81), and then performs step S60 of determining whether the reference time has elapsed.

In other words, if the control command received by the communication portion 59 is a request for change of the time information including the activation time and deactivation time, or the reference period (A), the control method of the present disclosure changes the time information (S81), and then performs step S60 of determining whether the reference time has passed.

The user may change the time information through the terminal input portion 95 provided in the remote control terminal 9. When the communication portion 59 receives the information about the activation time and the deactivation time (or a reference period) sent from the terminal communication portion 93, the second controller 7 may determine that a request for change of the time information has been made.

If the control command received by the communication portion 59 is a signal requesting operation of the first load portion (B), the control method of the present disclosure performs step S82 of supplying power to the first controller 6 and step S83 of supplying power to the first load portion.

The step S82 of supplying power to the first controller 6 is performed as the second controller 7 closes, through the power input portion 51, the power supply circuit formed by the first controller power line 85.

The step S83 of supplying power to the first load is performed as the first controller 6 controls the load portion switch 811 to close the power supply circuit formed by the load portion power line 81.

When power is supplied to the first controller 6 and the first load portion, the control method of the present disclosure performs step S84 of operating the first load portion according to the control command received through the communication portion 59.

Once the first load portion operation step S84 is completed (S85), the present disclosure re-executes the standby step. That is, once the first load portion operation step is completed (S85), the present disclosure interrupts the power supplied to the first controller 6, the first load portion and the communication portion 59, and maintains power supplied to the second controller 7.

The step of re-executing the standby step may include a step of the second controller 7 controlling the power input portion 51 to interrupt the power supplied to the first controller 6 and the first load portion, and a step of the second controller 7 controlling the communication portion switch 891 to interrupt the power supplied to the communication portion 59.

In some implementations, the step of re-executing the standby step may be configured to sequentially perform a step of the first controller 6 controlling the load portion switch 811 to interrupt the power supplied to the first load portion, a step of the second controller 7 controlling the power input portion 51 to interrupt the power supplied to the first controller 6, and a step of the second controller 7 controlling the communication portion switch 891 to interrupt the power supplied to the communication portion 59.

In some implementations, even if the user goes out without setting the remote control mode (e.g., without the power being supplied to the first load portion and the second load portion through the power input portion), the communication portion 59 is set to communicate with the remote control terminal 9 according to the preset time information. For example, even if the user leaves without setting the remote control mode, the user may remotely control the laundry treating apparatus. Therefore, the amount of standby power consumed by the laundry treating apparatus may be minimized.

To maximize the above-mentioned effect, the control method of the present disclosure may further include a message transmission step S40 of transmitting a message indicating that the communication portion 59 is in the activated state to the remote control terminal 9 when power is supplied to the communication portion (S30).

The message transmission step S40 is effective in that the user is guided for remote control. However, the message transmission step S40 may be an inconvenient step of forcing the user to receive an unnecessary message if the user does not desire remote control. In this case, the user may address the inconvenience by modifying the time information through the time information change step S81. In some cases, the user may disable the message transmission step S40.

While a description has been given of a case where the electronic apparatus and the control method for the same are applied to the laundry treating apparatus 100, the present disclosure may be also applicable to electronic apparatuses such as dishwashers and ovens.

For example, when the present disclosure is applied to a dishwasher, the concept of the first load portion among the features described above may need to be modified to include at least one of a pump for spraying water onto an object to be washed and a heater for heating water supplied to the pump.

In examples where the present disclosure is applied to an oven, the concept of the first load portion among the features described above may need to be modified to include at least one of a heater for heating a space for accommodating an object to be heated and a fan for circulating or discharging air in or from the space accommodating the object to be heated.

As apparent from the above description, the present disclosure may have effects as follows.

The present disclosure provides electronic equipment capable of minimizing consumption of standby power of a remotely controllable apparatus and a control method for the same.

In addition, the present disclosure provides an electronic apparatus that is remotely controllable even when the user goes out without setting a remote control mode and a control method for the same.

It will be apparent to those skilled in the art that various modifications and variations can be made in the present disclosure without departing from the spirit or scope of the disclosure. Thus, it is intended that the present disclosure cover the modifications and variations of this disclosure provided they come within the scope of the appended claims and their equivalents.

What is claimed is:

1. A method of controlling an electronic apparatus including a first load portion configured to receive power from a power source to generate electrical or mechanical energy, a first controller configured to control the first load portion, a communication portion configured to communicate with a remote control terminal that is configured to transmit a control command, a power input portion configured to open and close both a first controller power line that connects the power source to the first controller and a load portion power line that connects the power source to the first load portion, a communication portion power line that connects the power source to the communication portion, a communication portion switch configured to open and close the communication portion power line, a load portion switch configured to open and close the load portion power line and to be controlled by the first controller, a second controller configured to control the communication portion and the communication portion switch and to communicate with the first controller, and a second controller power line that connects the power source to the second controller, the method comprising:
supplying power to the second controller;
receiving an activation time for supplying power to the communication portion and a deactivation time for interrupting power to the communication portion;
setting time information based on the activation time and the deactivation time;
based on the time information, performing a standby step that includes interrupting power to the first controller, the first load portion, and the communication portion while supplying power to the second controller;
based on the activation time, controlling the communication portion switch to supply power to the communication portion;
determining whether the communication portion has received the control command from the remote control terminal; and
based on determining that the communication portion has not received the control command from the remote control terminal, interrupting the power supplied to the communication portion and re-executing the standby step.

2. The method according to claim 1, further comprising:
controlling the power input portion to supply power to the first controller based on determining that the communication portion has received the control command from the remote control terminal;
controlling the load portion switch to supply power to the first load portion; and
controlling, by the first controller, the first load portion to perform an operation corresponding to the received control command.

3. The method according to claim 2, further comprising, based on completion of the operation by the first load portion:
controlling the power input portion and the communication portion switch to interrupt power to the first controller, the first load portion, and the communication portion; and
re-executing the standby step.

4. The method according to claim 2, wherein re-executing the standby step based on completion of the operation by the first load portion includes:
controlling, by the first controller, the load portion switch to interrupt power supplied to the first load portion;
controlling, by the second controller, the power input portion to interrupt power to the first controller; and
controlling, by the second controller, the communication portion switch to interrupt power to the communication portion.

5. The method according to claim 1, further comprising, based on the second controller controlling the communication portion switch to supply power to the communication portion, transmitting a message to the remote control terminal to indicate that the communication portion is activated.

6. The method according to claim 1, wherein receiving the activation time and the deactivation time includes receiving the activation time and the deactivation time through a user input portion of the electronic apparatus configured to receive a user input.

7. The method according to claim 1, wherein receiving the activation time and the deactivation time includes receiving the activation time and the deactivation time through the remote control terminal.

8. The method according to claim 1, wherein setting the time information includes setting a reference period of time for which power is supplied to the communication portion.

9. The method according to claim 1, further comprising, based on receiving the control command from the remote control terminal requesting change of the activation time and the deactivation time, changing the activation time and the deactivation time while the second controller controlling the communication portion switch to supply power to the communication portion.

10. The method according to claim 1, wherein controlling the communication portion switch to supply power to the communication portion includes supplying power to the communication portion for a predetermined period of time from the activation time.

11. The method according to claim 1, wherein controlling the communication portion switch to supply power to the communication portion includes supplying power to the communication portion from the activation time until the deactivation time.

12. The method according to claim 1, wherein determining whether the communication portion has received the control command from the remote control terminal includes determining whether the communication portion has received the control command from the remote control terminal between the activation time and the deactivation time.

13. The method according to claim 1, wherein determining whether the communication portion has received the control command from the remote control terminal includes determining whether the communication portion has received the control command from the remote control terminal within a predetermined time from the activation time.

14. The method according to claim 1, wherein supplying power to the second controller includes supplying power to the second controller regardless of the power input portion opening or closing the first controller power line.

15. The method according to claim 1, further comprising controlling the power input portion to supply power to the first controller based on determining that the communication portion has received the control command from the remote control terminal.

16. An electronic apparatus for remote control through a remote control terminal configured to remotely transmit a control command, the electronic apparatus comprising:
a first load portion configured to receive power from a power source to generate electrical or mechanical energy;
a first controller configured to control the first load portion;
an input portion configured to receive a user input;
a first controller power line connecting the power source to the first controller;
a load portion power line connecting the power source to the first load portion;
a power input portion configured to open and close both of the first controller power line and the load portion power line;
a communication portion configured to communicate with the remote control terminal;
a communication portion power line connecting the power source to the communication portion;
a communication portion switch configured to open and close the communication portion power line;
a load portion switch configured to open and close the load portion power line, the load portion switch being controlled by the first controller; and
a second controller configured to receive power from the power source through a second controller power line, to communicate with the first controller, and to control the communication portion, the communication portion switch, and the input portion,
wherein the second controller is further configured to:
receive an activation time and a deactivation time of the electronic apparatus through the remote control terminal or the input portion, and
supply power to the communication portion for a predetermined period time between the activation time and the deactivation time based on the power input portion interrupting power to the first controller and the first load portion.

17. The electronic apparatus according to claim 16, wherein the first load portion comprises at least one of a motor configured to rotate a drum accommodating clothes, a valve configured to open and close a water supply pipe connecting a water supply source to the drum, or a drainage pump configured to drain water from the drum.

18. The electronic apparatus according to claim 16, wherein the first load portion comprises at least one of a motor configured to rotate a drum accommodating clothes or an air supply portion configured to supply heated air to the drum.

19. The electronic apparatus according to claim 16, wherein the first load portion comprises at least one of a pump configured to spray water onto an object to be washed or a heater configured to heat water supplied to the pump.

20. The electronic apparatus according to claim 16, wherein the first load portion comprises at least one of a heater configured to provide heat to a space for accommodating an object or a fan configured to circulate or discharge air in or from the space accommodating the object.

* * * * *